(No Model.) 3 Sheets—Sheet 1.
A. P. TROTTER.
APPARATUS FOR DISTRIBUTING AND DIFFUSING LIGHT.
No. 330,356. Patented Nov. 10, 1885.
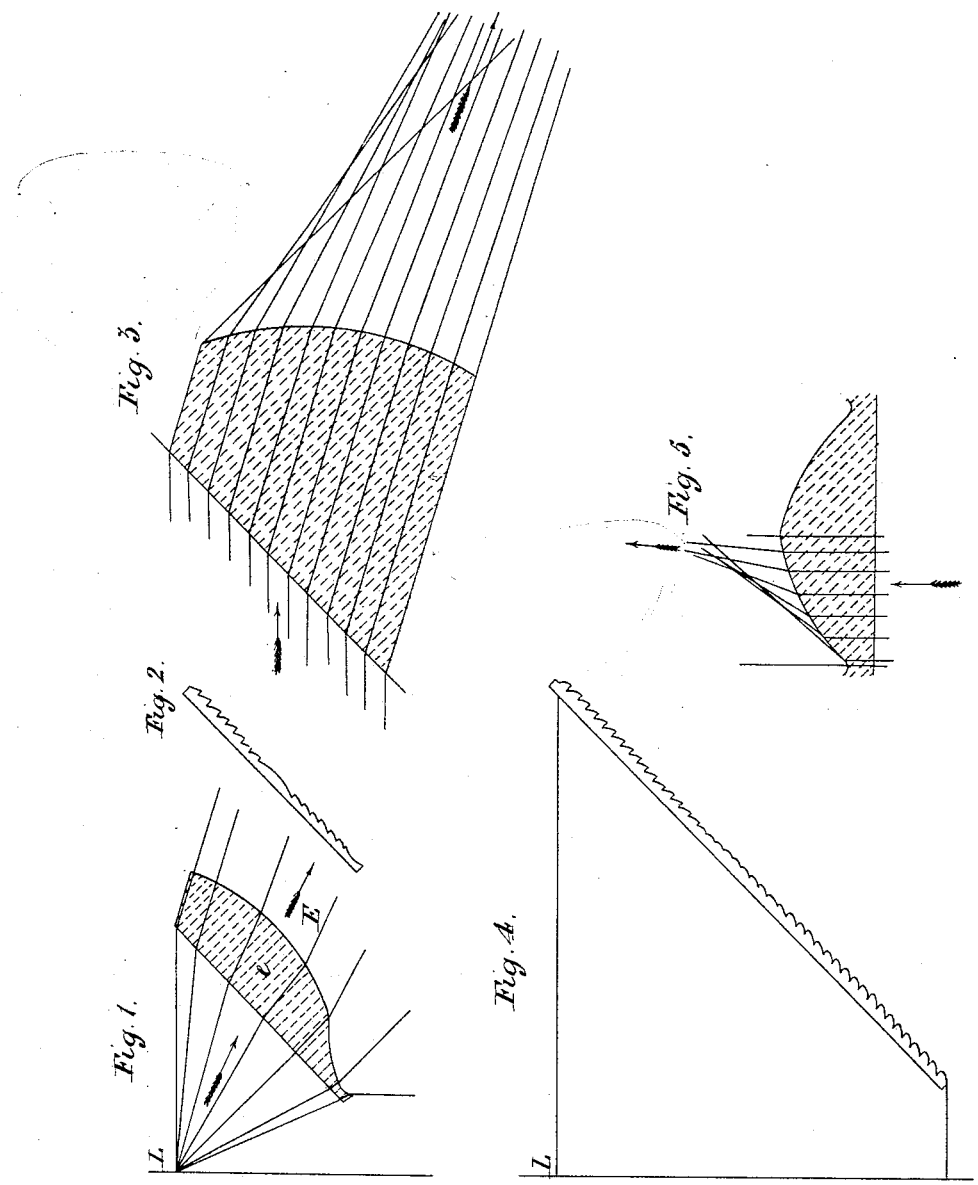
Witnesses,
John H. Phillips, Sr.
Robert Everell
Inventor.
Alexander P. Trotter,
By James L. Norris.
Atty.

(No Model.) 3 Sheets—Sheet 2.

A. P. TROTTER.
APPARATUS FOR DISTRIBUTING AND DIFFUSING LIGHT.

No. 330,356. Patented Nov. 10, 1885.

(No Model.) 3 Sheets—Sheet 3.
A. P. TROTTER.
APPARATUS FOR DISTRIBUTING AND DIFFUSING LIGHT.
No. 330,356. Patented Nov. 10, 1885.
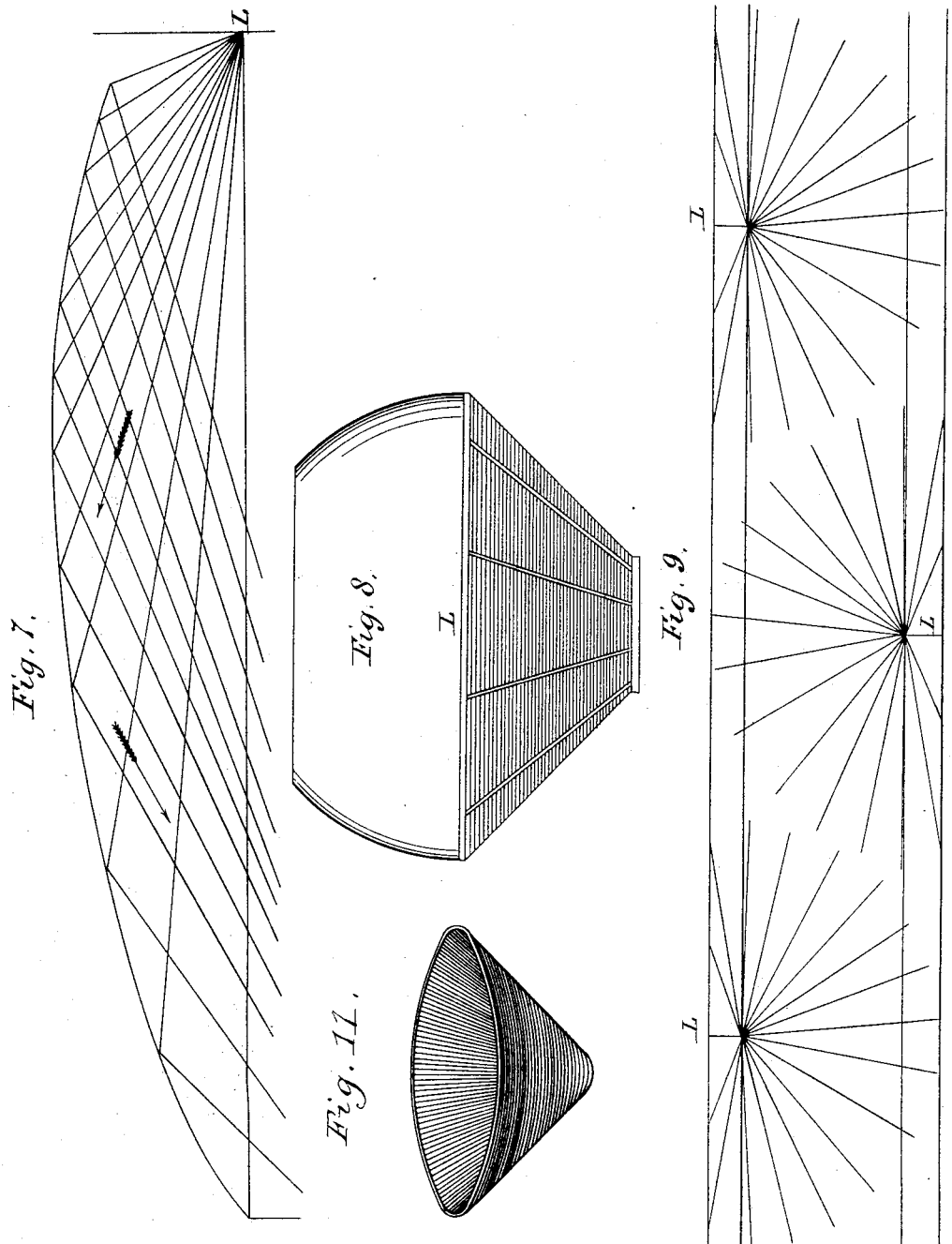
Witnesses,
John H. Phillips, Jr.
Robert Everett.
Inventor.
Alexander P. Trotter.
By James L. Norris.
Atty.

UNITED STATES PATENT OFFICE.

ALEXANDER PELHAM TROTTER, OF FURNIVALS INN, COUNTY OF MIDDLESEX, ENGLAND.

APPARATUS FOR DISTRIBUTING AND DIFFUSING LIGHT.

SPECIFICATION forming part of Letters Patent No. 330,356, dated November 10, 1885.

Application filed March 17, 1883. Serial No. 88,597. (No model.) Patented in England January 15, 1883, No. 233; in France, January 24, 1883, No. 153,303, and in Belgium February 1, 1883, No 60,238.

*To all whom it may concern:*

Be it known that I, ALEXANDER PELHAM TROTTER, a citizen of England, residing at Furnivals Inn, in the county of Middlesex, England, have invented an Improved Apparatus for Distributing and Diffusing Powerful Lights, (for which I have obtained a patent in Great Britain, No. 233, dated January 15, 1883; in France, by patent dated January 24, 1883, No. 153,303, and in Belgium, by patent dated February 1, 1883, No. 60,328,) of which the following is a specification.

When powerful lights—such as those of electric lamps—are employed for illuminating spaces, the intensity of the light in the parts of space near the lamp is excessively great, while in the more distant parts it is too small, and in order to prevent the dazzling effect of the intense source of light recourse is often had to opal or frosted glasses, which cause a loss of a very large portion of the light.

My invention relates to a method and apparatus for effecting distribution of such lights with approximate uniformity over considerable areas, and for the diffusion of light so that it does not dazzle, these results being attained by the use of specially-formed clear glass, which involves comparatively little loss of light. I will explain the manner in which I form the glass for this purpose by reference to the accompanying drawings, which illustrate examples of my method.

Figure 6:
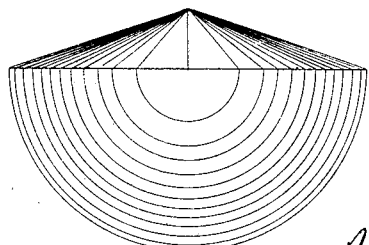

In the said drawings, Figure 1 is a diagram illustrating the manner of determining a curve; Fig. 2, a vertical section of a glass; Fig. 3, a diagram showing one of the steps in vertical section; Fig. 4, a vertical section of a glass; Fig. 5, a diagram showing one of the vertical flutings in cross-section; Fig. 6, a diagram illustrating the equal illumination of a circular area; Fig. 7, a diagram showing a reflector; Fig. 8, an elevation of one of the cones or pyramids; Fig. 9, a diagram illustrating the uniform illumination of a street, and Fig. 10 a diagram showing part of a vertical section of the glass and indicating the directions given the rays. Fig. 11 is a perspective view of a conical reflector, showing vertical flutings on the inner and horizontal flutings on the outer surface.

Figure 10:
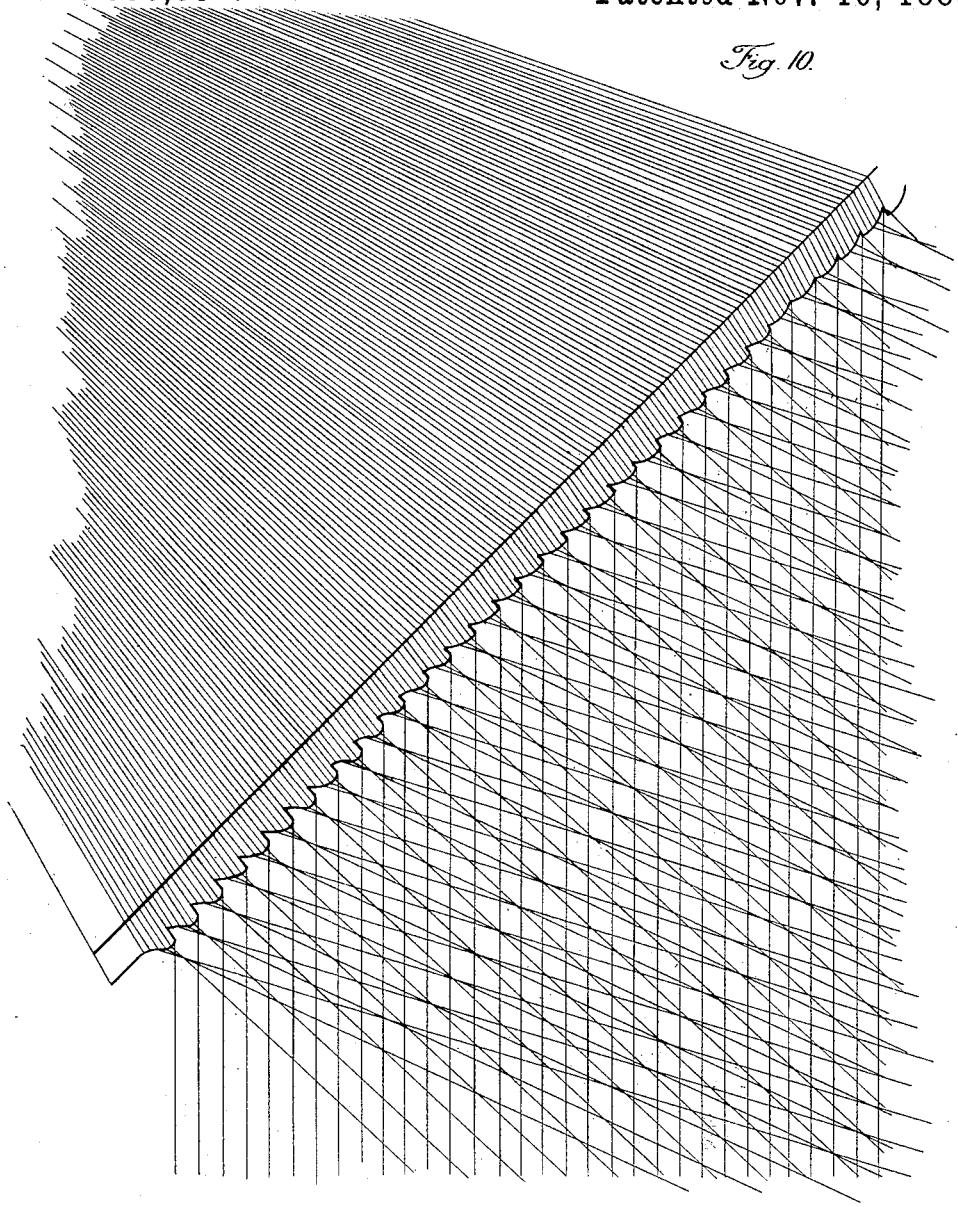

Referring to Fig. 8, the glass or reflector is preferably a rectangular cone, or it may be a pyramid, having the light L situated in the center of its base. It may be cast or molded in one piece, or, for convenience of manufacture it may be made up of separate panes, as indicated in said figure. The surface of the cone or pyramid is divided into a number of small horizontal steps or prisms, as shown in Fig. 4. In Fig. 10 these steps or prisms are shown at about full size for a large refracting-glass. The surface of each one of these steps or prisms is a curve, which is accurately determined, so that the rays passing through it will be distributed over the surface to be illuminated in the desired proportion. The manner of determining the curve to be given these steps will now be explained.

Supposing the light to emanate from one central source and the area to be illuminated to be circular, it may be assumed that this circular surface is divided into a number of annuli of equal area, (see Fig. 6,) their radii being as $\sqrt{1}:\sqrt{2}:\sqrt{3}$, and so on. The result to be attained is the distribution of the light in such manner that each annulus shall receive the same quantity; hence the rays emanating at equal angles with each other must be so refracted that the tangents of their new inclinations to the vertical are as $\sqrt{1}:\sqrt{2}:\sqrt{3}$, &c. To find the proper curve to be given to the refracting-surface in order to distribute the light in the desired proportion, a calculation may be made by taking a number of rays—say twenty—emanating at equal distances with each other and incident on the inner surface of the glass at known angles. (See Fig. 1.) The refracting-angle for each ray is now determined in the known way, so that on leaving the glass the tangents of their new inclinations to the vertical are in the relation of the square roots of the natural numbers. By joining together the surfaces thus determined a polygonal figure is found, and from this the curve represented by the line E, to which it constantly approximates, as the number of sides of the polygon is made infinitely larger, is determined. By dividing the lens into a number of zones, as indicated by Fig. 2, each zone having the curvature of the corresponding part of surface E, the necessity for a glass of great thickness is avoided. By thus calculating for each step or prism the refracting-angles of a series of rays passing through the same the proper distribution curve for such step or prism may be found. The construction of one of these curves is shown in Fig. 3, and the whole section, with its successive steps, is represented in Fig. 4.

In Fig. 10 I have shown on a large scale a vertical section of a portion of a lens or lantern-glass. The lines passing through the glass indicate the paths of some of the rays, and show their new inclinations on leaving the refracting-surface. Each prismatic zone then sends light to a considerable portion of the area; and, conversely, from any position on the area light is received in uniform quantity from a considerable number of the prisms, but only from one point on each. The light would therefore proceed from a row of images on a vertical plane. By such an arrangement the light would be equally distributed, but its dazzling appearance would not be materially affected. To meet this, one surface (preferably the inner surface) of the cone or glass is provided with flutings, the surface of each of which is a curve such as shown in Fig. 5. The curves of the vertical flutings are uniform. The curve is found by drawing, say, ten lines, Fig. 5, representing equidistant parallel rays. One of these passes directly through the glass. The next is deflected through, say, five degrees. The requisite refracting-angle is found and set out. The next ray is to be deflected through twice this amount, or ten degrees; the next through fifteen degrees, and so on until the critical angle is approached. The curve to which the resulting polygon is an approximation is then the curve desired. Instead of having these vertical flutings on the inner surface of the glass, and the horizontal steps or zones on the outer surface, the reverse arrangement may be adopted; or they may both be upon one surface—i. e., the horizontal series of steps or zones may be broken up into separate lenses, each of which will have the form of Fig. 5 in horizontal section; or one set may be upon one glass and the other upon another, the two glasses being placed together. The preferred arrangement, however, is that described.

As in most cases the rays of light which are directed upward are useless for illumination, I generally place above the lantern a reflector—such as is shown in Fig. 7—of a form determined so as to give uniform distribution by reflection downward. When a portion of the light reflected upward is required—as, for example, to light a ceiling—the reflector instead of being opaque may be of opaline glass, so as to reflect part of the light, and to allow part of the light to pass through. Instead of a reflector such as shown in Fig. 7, a hemispherical reflector may be used, each ray being reflected back to the source of light, and proceeding thence along with the direct rays through the glass of the lantern.

When the space to be illuminated is not of regular circular shape, but of other forms, the shape of the lantern and the curves of its flutings are varied to suit the form. For example, in the case of a lantern to light a foot-pavement or a railway-platform I make the curvature of the flutings such as to direct the light mostly along the line of pavement or platform. In many cases the lights are arranged, as shown in Fig. 9, alternately spaced on opposite sides of a street, so that each has to illuminate a triangular area. In such a case a lantern of triangular form would be suitable.

For small lights—such as those of incandescent electric lamps—the glass lantern may be made in one piece. For larger lights it is preferable to make it as a polygonal framing with separate glass panes.

Having thus described the nature of my invention and the best means I know of carrying it into practical operation, I claim—

1. A lantern glass or refractor provided with a number of horizontal steps or prisms, the surfaces of said steps or prisms being distribution-curves, determined as set forth, to distribute the light uniformly over a considerable area, substantially as described.

2. A lantern-glass having on one surface horizontal steps or prisms with curved refracting-surfaces for uniformly distributing the light passing through them, and on the other vertical curved flutings, substantially as and for the purpose set forth.

In testimony whereof I have signed my name to this specification, in the presence of two subscribing witnesses, this 5th day of March, A. D. 1883.

ALEXANDER PELHAM TROTTER.

Witnesses:
OLIVER IMRAY,
JNO. P. M. MILLARD.